No. 888,602. PATENTED MAY 26, 1908.
R. J. FLEISCHER.
SECONDARY BATTERY.
APPLICATION FILED APR. 8, 1907.
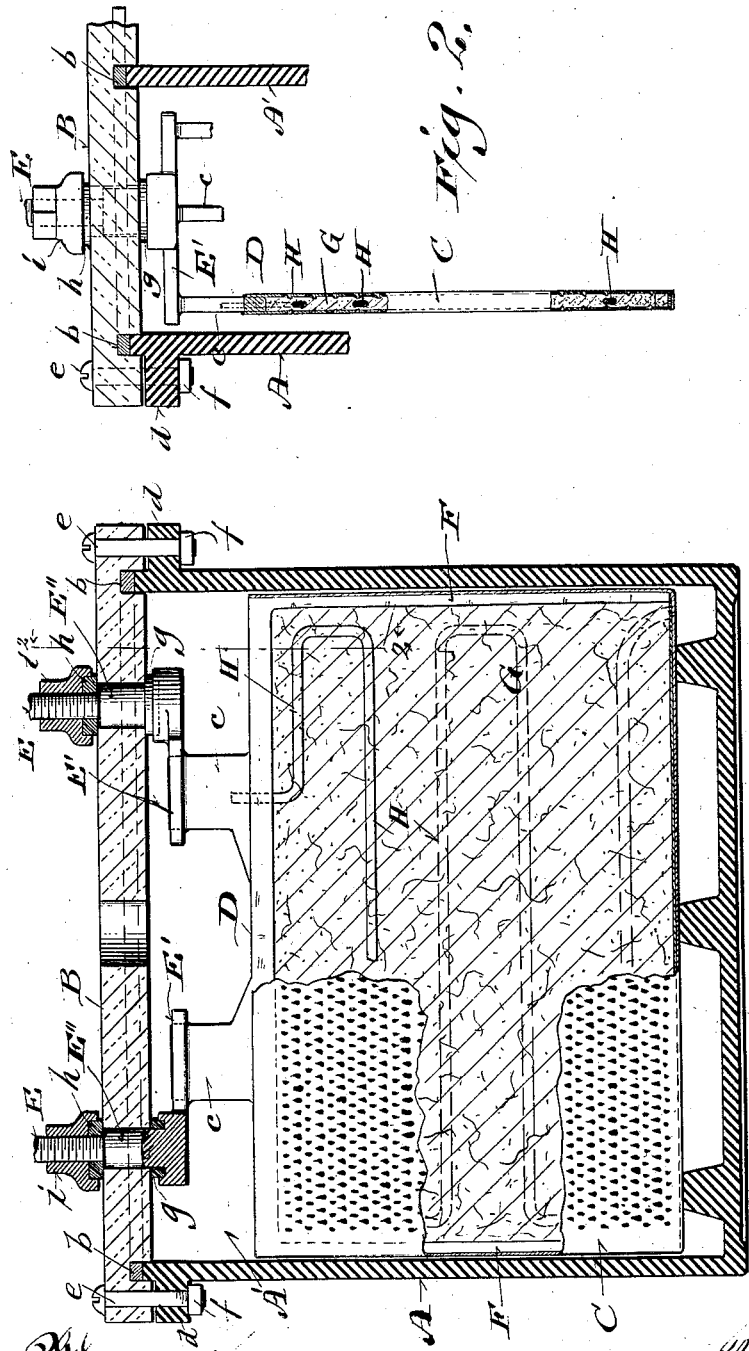

UNITED STATES PATENT OFFICE.

RICHARD J. FLEISCHER, OF MILWAUKEE, WISCONSIN.

SECONDARY BATTERY.

No. 888,602.  Specification of Letters Patent.  Patented May 26, 1908.

Application filed April 8, 1907. Serial No. 366,930.

*To all whom it may concern:*

Be it known that I, RICHARD J. FLEISCHER, a citizen of the United States, and resident of Milwaukee, in the county of Milwaukee and State of Wisconsin, have invented certain new and useful Improvements in Secondary Batteries; and I do hereby declare that the following is a full, clear, and exact description thereof.

The invention consists in what is herein shown, described and claimed, as having especial reference to an effective sealing of the jars of secondary batteries.

Figure 1 of the drawings represents a sectional view of a secondary battery embodying my improvements, an electrode of the same being partly broken away; Fig. 2, a sectional view of a fragment of the battery showing an electrode partly broken away and connected to a binding-post plate common to a plurality of electrodes, this view being indicated by line 2—2 in Fig. 1; Fig. 3, a transverse section of a fragment of an electrode, the same being magnified; and Fig. 4, a side elevation of a fragment of a perforated metallic plate portion of an electrode magnified.

Referring by letter to the drawings, A indicates an ordinary secondary battery jar having a detachable cover B of glass or other suitable material provided with suitably arranged binding-post apertures and gas-vent apertures. The underside of the cover is grooved to match the continuous rim of the battery-jar and jar-partitions A' that engage the grooves against suitable acid-resisting packing material b arranged therein, and due to the arrangement of said grooves the packing is so protected as to be most durable and effective. The jar is provided with an endless upper outer continuous flange d, on a plane below its rim and the upper ends of the partitions aforesaid the cover B and said jar-flange being provided with registering apertures for bolts e having clamping nuts f run on their screw-threaded ends. If the jar-cover be of glass or other transparent material, the jar-contents and working of the battery can be readily inspected at any time without removal of said cover. It is essential to an efficient sealing of the cover on the jar, that the rim of said jar extend above the flange d and engage cover-grooves containing suitable packing, as aforesaid, and the partitions being similarly extended and likewise engaged with cover-grooves containing suitable packing, the liquid contents of each compartment of said jar is effectively isolated from the adjacent compartment or compartments.

Each electrode of the battery comprises a casing-body C, the same being a thin and suitably perforated sheet of lead or other suitable metallic substance. It is preferable, as herein shown, to fuse the casing-body to a top bar D of lead or other suitable material having a shank c fused or otherwise suitably joined to a binding-post base E' common to a plurality of electrodes, and it is also preferable, as herein shown, to fuse said casing-body to end bars F of lead or other suitable material, the bars aforesaid enhancing the conductivity of the electrode.

Each binding-post base E' is of lead or other suitable acid-resisting material and has a neck E'' that extends through an aperture in the jar-cover with which aperture it has snug engagement, and a seat is provided in said base for an acid-resisting packing-washer g that surrounds said neck and abuts the underside of said cover. The neck portion E'' of each base E' is cast on its companion binding-post E, and run on this post is a clamping nut i provided with a lower end recess engaged by a cover-opposing acid-resisting packing-washer h, this washer and the one g aforesaid being insured against loss and detrimental deterioration. It is also to be understood, that because of the neck E'' of the binding-post base E', as well as the arrangement and confinement of the washers g, h, the electrolyte of the battery is prevented from attacking the binding-post proper, this being an important feature of my invention.

The casing is filled with a suitable active material G with which shreds of pure or suitably alloyed lead are incorporated to bond said active material and improve the conductivity of the electrode, this mixture of shreds of lead with the aforesaid active material being an important feature of my improvements, and to further enhance the conductivity of each electrode, a preferably flattened ductile wire H is coiled in said casing, one end of the wire being fused in connection with the top-bar D and a shank c aforesaid. The casing is filled with the active material from the bottom, said casing being inverted during the filling process, and as the filling proceeds, the wire H is bent from time to time to form the coils of same. The bottom of the casing is shown closed, as a result of infolding of the sides of its body C, and the lapping folds may be fused together if desired. However the bottom of said casing may be otherwise suitably closed.

From the foregoing, it will be understood that the particles of the electrodes of the battery cannot become detached and fall into the submerging fluid to the detriment of said battery, as is frequently the case where the active material of originally powder form is mixed with other suitable material to form a plastic applied to lead-grids upon which it sits, as is common practice.

The perforations of the casing-body C of each electrode are preferably formed by triangular indentation of the same at suitable intervals thereof, the convergence of each perforation being toward the bottom of the electrode, and struck in portions of said casing-body adjacent to the perforations constitute triangular lips that become embedded in the filling of said electrode. By this construction, best shown in Fig. 3 and 4, the conductivity of the electrode is improved and ample clearance obtained for entrance of the submerging fluid into said electrode and the ready escape of gases therefrom.

I claim:

1. A secondary battery comprising a partitioned jar having an upper outer flange below its rim, a cover having a continuous underside groove engaging the rim and a groove engaging each partition, packing in the grooves opposing said rim and partition, and means for holding said cover in detachable connection with said flange.

2. A secondary battery comprising a jar having a cover in detachable liquid-tight connection therewith and provided with binding-post apertures, acid-resisting binding-post washers facing opposite sides of the cover concentric with said apertures, the inner washers being supported on binding-post bases, and binding-post nuts having lower end recesses engaged by the outer washers.

In testimony that I claim the foregoing I have hereunto set my hand at Milwaukee in the county of Milwaukee and State of Wisconsin in the presence of two witnesses.

RICH. J. FLEISCHER.

Witnesses:
N. E. OLIPHANT,
GEORGE FELBEL.